(12) United States Patent
Owens

(10) Patent No.: US 10,732,604 B2
(45) Date of Patent: *Aug. 4, 2020

(54) SYSTEM AND METHOD FOR VIRTUALLY CALIBRATING A COMPUTER NUMERIC CONTROLLED MACHINE TO COMPENSATE FOR SURFACE DISTORTIONS

(71) Applicant: Timothy Owens, Perrysburg, OH (US)

(72) Inventor: Timothy Owens, Perrysburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,099

(22) Filed: Dec. 21, 2018

(65) Prior Publication Data

US 2019/0121315 A1 Apr. 25, 2019

Related U.S. Application Data

(63) Continuation of application No. 14/180,922, filed on Feb. 14, 2014, now Pat. No. 10,203,684.

(60) Provisional application No. 61/764,186, filed on Feb. 13, 2013.

(51) Int. Cl.
*G06F 17/00* (2019.01)
*G05B 19/401* (2006.01)

(52) U.S. Cl.
CPC .. *G05B 19/401* (2013.01); *G05B 2219/36087* (2013.01); *G05B 2219/37619* (2013.01); *G05B 2219/49166* (2013.01); *G05B 2219/49193* (2013.01); *G05B 2219/49194* (2013.01); *Y02P 90/265* (2015.11)

(58) Field of Classification Search
CPC .................................................. G05B 19/401

USPC .......................................................... 700/114
See application file for complete search history.

(56) References Cited

U.S. PATENT DOCUMENTS

| | | | | |
|---|---|---|---|---|
| 4,118,139 A | * | 10/1978 | Lemelson | B23B 49/001 408/12 |
| 4,733,049 A | * | 3/1988 | Lemelson | B23B 49/001 219/121.65 |
| 4,819,195 A | * | 4/1989 | Bell | G01B 7/008 318/632 |

(Continued)

OTHER PUBLICATIONS

Repetier, "Z-Probing with Repetier-Firmware", Feb. 3rd, 2013, pp. 1-5, [retrieved on Mar. 29, 2016]. Retrieved from http://www.repetier.com/documentation/repetier-fiirmware/z-probing/.

*Primary Examiner* — Evral E Bodden
(74) *Attorney, Agent, or Firm* — Shumaker, Loop & Kendrick, LLP; James D. Miller

(57) ABSTRACT

A method for calibrating a CNC machine including providing instructions for machining a surface of a distortion-free object, selecting a true axis of movement of a toolhead of the machine using the instructions, instructing the toolhead to travel on an object to be machined along the true axis of movement, but where the toolhead actually travels along an actual axis that is deviated from the true axis as a result of the surface distortions on the object to be machined, selecting multiple points along the actual axis traveled by the toolhead on the object to be machined, comparing the distance of the multiple points along the actual axis from the true axis to determine offset amounts from the true axis corresponding to a lack of straightness of the object to be machined, and modifying the instructions to compensate for the offset amounts before uploading the instructions to a CNC controller.

20 Claims, 2 Drawing Sheets

(56) References Cited

U.S. PATENT DOCUMENTS

| | | | | |
|---|---|---|---|---|
| 5,508,596 A | * | 4/1996 | Olsen | G05B 19/237 318/569 |
| 5,575,597 A | * | 11/1996 | Bailey | B23Q 1/5462 408/234 |
| 5,621,964 A | * | 4/1997 | Susnjara | B23B 39/167 29/527.1 |
| 5,837,960 A | | 11/1998 | Lewis et al. | |
| 5,917,726 A | | 6/1999 | Pryor | |
| 6,286,055 B1 | | 9/2001 | Yamakazi et al. | |
| 6,360,575 B1 | | 3/2002 | Zavodchikov | |
| 6,721,675 B1 | | 4/2004 | Chawla | |
| 6,847,908 B2 | | 1/2005 | Chawla | |
| 7,123,985 B2 | | 10/2006 | Wildsmith et al. | |
| 7,761,183 B2 | * | 7/2010 | Sullivan | G05B 19/4093 700/18 |
| 8,712,577 B2 | * | 4/2014 | Gu | G05B 19/401 409/131 |
| 2014/0163717 A1 | | 6/2014 | Das et al. | |

* cited by examiner

SYSTEM AND METHOD FOR VIRTUALLY CALIBRATING A COMPUTER NUMERIC CONTROLLED MACHINE TO COMPENSATE FOR SURFACE DISTORTIONS

CROSS REFERENCE TO RELATED APPLICATIONS

This application is a Continuation application of U.S. patent application Ser. No. 14/180,922, filed Feb. 14, 2014, titled "System and Method for Virtually Calibrating Computer Numeric Controlled Machines Axes," which claims priority to U.S. Provisional Patent Application Ser. No. 61/764,186, filed Feb. 13, 2013, titled "System and Method for Virtually Calibrating Computer Numeric Controlled Machines Axes".

TECHNICAL FIELD AND BACKGROUND OF THE INVENTION

The present invention relates generally to the field of calibrating a multi-axis machining system, and more particularly, to a system and method for virtually calibrating automated equipment running on an xyz-coordinate system.

Multi-axis machining systems such as Computer Numeric Controlled (CNC) machining systems can be used to precisely machine and fabricate a workpiece from a set of instructions. Such systems typically include a table for supporting the workpiece, and a toolhead positioned vertically above the table and moveable relative thereto along one or more of x, y and z linear axes, as well as rotational axes. Movement of the toolhead along the axes can be controlled by instructions implemented, for example, by Computer Aided Design (CAD) software.

One well known format of CNC instruction codes is known as "g-codes". G-codes are translation instructions in which GO represents a linear movement, and G02 and G03 represent circular or arcuate movements for the toolhead. The process for creating a g-code file involves defining a series of g-codes that represent various contours of the finished product, such as from a model, and defining the requirements of the CNC machine. CNC machine requirements include identifying and labeling features of the model, selecting cutting tools for the toolhead, determining machining speeds, defining an orientation of the workpiece, etc.

After the instruction codes defining the finished model are formulated, the instruction codes are passed to the CNC controller of the CNC machine. The CNC controller uses the instruction codes comprising the g-codes to precisely control the toolhead and cutting tool to machine the workpiece into the finished product.

Before machining, it has been necessary to calibrate the machine to ensure that the mechanical components are in alignment to achieve satisfactory performance from the machine. Machine components can move out of alignment over time as a result of physical contact, machine transport, component wear and normal use. Conventional methods for calibrating a CNC machine to bring components back into alignment include mechanically adjusting the toolhead path along the y-axis, adjusting perpendicularity between the adjusted y-axis and x-axis (i.e., squaring), adjusting the z-axis relative to the y-axis, x-axis and x-y plane, as well as adjustments of rotational axes perpendicular to the x-y plane, among other adjustments.

Such mechanical calibration methods are disadvantageous because they are time consuming and result in significant downtime for the machine. Accordingly, what is needed is a method of virtually calibrating a CNC machine that ensures that the machine performs satisfactorily without the need for mechanical calibration methods.

BRIEF SUMMARY OF THE INVENTION

The following discussion discloses and describes a method for virtually calibrating a CNC machine including providing instructions for machining a surface of a distortion-free object, selecting a true axis of movement of a toolhead of the machine using the instructions, instructing the toolhead to travel on an object to be machined along the true axis of movement, but where the toolhead actually travels along an actual axis that is deviated from the true axis as a result of the surface distortions on the object to be machined, selecting multiple points along the actual axis traveled by the toolhead on the object to be machined, comparing the distance of the multiple points along the actual axis from the true axis to determine offset amounts from the true axis corresponding to a lack of straightness of the object to be machined, and modifying the instructions to compensate for the offset amounts before uploading the instructions to a CNC controller.

In a further embodiment, the method includes computing the slope of a line through the selected multiple points and comparing the slope of the line to the true axis of movement to determine the angular displacement of the line and offset amounts.

In a further embodiment, the true axis is a straight line along one of x, y and z linear axis of movement of the toolhead, the x and y axes being arranged perpendicular to one another and traveling on a horizontal plane parallel with a table of the CNC machine, and the z axis traveling perpendicular relative to the x-y horizontal plane.

In a further embodiment, the method includes loading the offset amounts of the selected points into a matrix containing offset coordinates to create a 3D model of a work area.

In a further embodiment, the method includes determining offset amounts along two of the x, y and z axes and comparing the offset amounts to virtually square the axes.

In a further embodiment, the method includes virtually leveling a z-axis of the CNC machine by determining offset amounts of multiple axes computed by taking an average of a number of points along the multiple axes and creating a grid to determine the slope.

In a further embodiment, the method includes uploading a CAD file to the CNC machine and translating the CAD file into g-code instructions prior to the step of selecting the true axis of movement of the toolhead of the CNC machine known to be a straight line.

In another embodiment, a method for virtually calibrating a CNC machine is provided herein and includes the steps of uploading a CAD file to the CNC machine, translating the CAD file into g-code instructions representing toolhead movement, selecting a linear axis of movement of the toolhead from one of x, y and z linear axes of movement, instructing the toolhead to travel along the selected linear axis of movement, selecting multiple points along an actual axis traveled by the toolhead, comparing the distance of the multiple points along the actual axis from the selected linear axis to determine offset amounts from the selected linear axis, and modifying g-code instructions to compensate for the offset amounts before uploading the g-codes to a CNC controller.

DETAILED DESCRIPTION OF THE INVENTION

Figure 1:
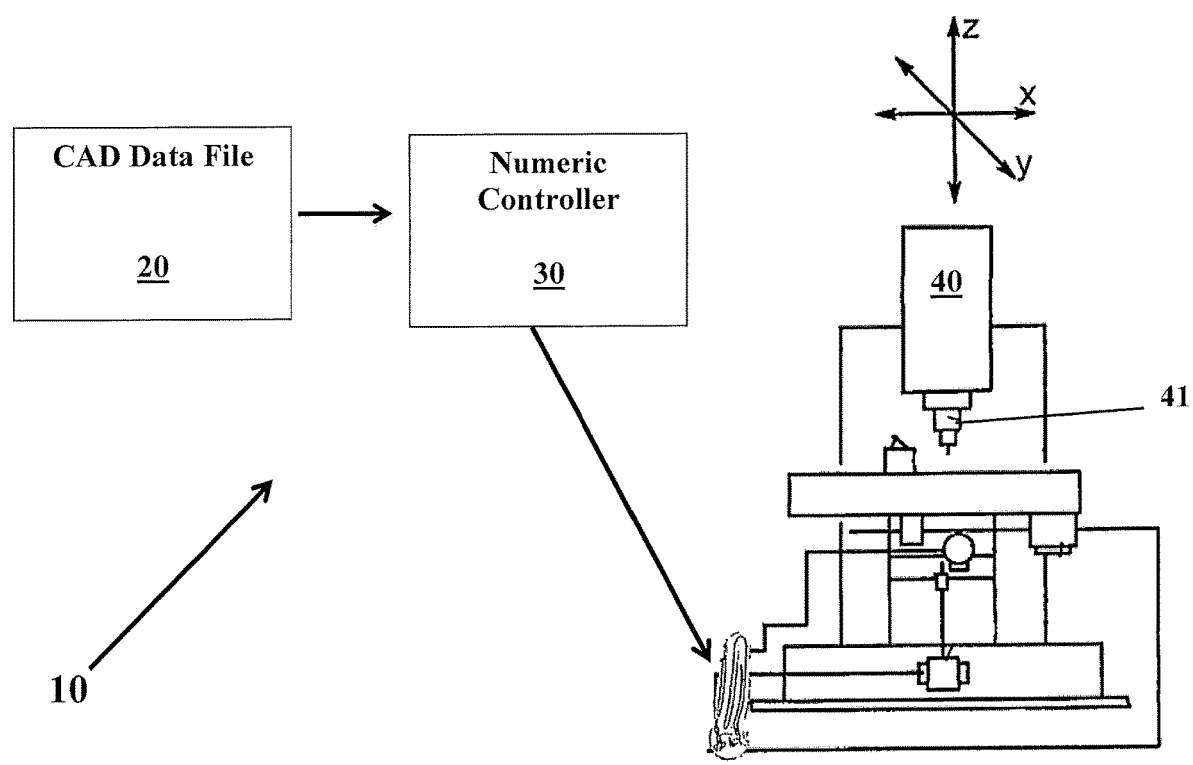
FIG. 1 is a system diagram according to an embodiment of the invention.

The present invention will now be described more fully hereinafter with reference to exemplary embodiments and the accompanying drawings in which exemplary embodiments of the invention are shown. It should be understood, however, that the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

The present invention is directed to a virtual calibration method for use with automated equipment operating based on a multi-axis coordinate system. In a specific application, the virtual calibration method is used with a CNC machine having a computer controlled toolhead moveable with respect to a table along one or more linear and rotational axes. The method generally includes determining deviations (i.e., alignment errors) of the toolhead along one or more of the x, y and z-axes, and altering the set of instructions loaded into the machine controller to be executed to account (i.e., correct) for these deviations. More specifically, the method relates to modifying the g-code instructions based on error adjustment along the axes before loading the g-code instructions into the CNC controller. In this manner, the toolhead executes according to the modified instructions to mill or fabricate the workpiece as modeled, even though the components of the machine may be mechanically out of alignment.

Typical CNC machines have x, y and z linear axes of movement. The x and y axes are arranged perpendicular to one another and travel on a horizontal plane parallel with the supporting surface of the table. The z-axis travels perpendicular relative to the x-y horizontal plane. In a mechanically calibrated CNC machine, the g-code instructions are carried out on the assumption that the linear axes and x-y table plane are mechanically aligned, as well as that the table surface is free of debris, protrusions and defects. In the present invention, the mechanical alignment of the axes and planes can be disregarded, assuming that the axes are not so grossly out of spec that they are not within the operating parameters of the present method.

Known to those skilled in the art, a CAD data file representing a two-dimensional (2D), two-and-a-half-dimensional (2½D), or three-dimensional (3D) drawing of the product model (i.e., the model representing the product to be machined or fabricated) is loaded into the machine. The CAD data file can then be converted into a universal design data model. As used herein, the term "CAD data file" is intended to generically refer to any software application for creating drawings or 3D renderings that can be machined, for example, computer aided drafting, sign making, engraving, carving, 3D modeling and sculpting software, among other examples. Also, as used herein, the term 3D model is intended to generically refer to any drawing, line art, vector art, point cloud or 3D model of an object or part to be machined, among other examples.

The universal design data model can then be passed to part feature recognition software that defines various part features of the data model (e.g. Pro/E software). With the various part features of the data model defined, the universal design data model is then converted to CNC instruction codes, for example, g-code translation instructions. For example, FIG. 1 illustrates an exemplary system 10 in which a CAD data file 20 is uploaded to a CNC machine 30, and more particularly, uploaded to the numeric controller of the CNC machine. In certain aspects, the CAD data file may be converted into g-code, which may be subsequently translated into movements executed by the machine toolhead 40. In certain aspects, these machines include servo motors capable of turning commands (e.g., g-code) into movements along the x, y, and z axes for machining and shaping an object into a desired form. In certain aspects, these g-code instructions control, for example, a spindle in a toolhead 41 of the machine tool 40. In certain aspects, the toolhead 41 may include cutting tools for machining and shaping an object. In the method according to the present invention, alignment errors along the machine's axes and therebetween are first identified and determined. If an offset error is found, the amount of offset is determined, and in preferable embodiments, the g-code instructions are modified based on offset errors prior to passing the g-codes to the CNC controller and prior to machining the object.

Offset deviations are calculated by loading deviations of points into a matrix containing offset coordinates, as well as potentially creating a 3D model of the work area. A virtual calibration module determines offset errors in the straightness of the linear axes and alignment of the linear axes with respect to one another (e.g., squaring) and for relational alignments. The virtual calibration module determines any deviations or lack of straightness in movement along any particular axis. After determining whether any deviation or lack of straightness along an axis is present, the virtual calibration module corrects for these deviations (i.e., errors). For example, if the toolhead's actual x, y or z-axis movement, or any combination thereof, is determined to deviate from movement known to be straight or square, the amount of deviation is determined and the g-code modified accordingly.

In certain aspects, when determining the machine's alignment, a first axis of movement may be selected from one of the x, y and z-axis or any combination thereof. For example, in the case of the y-axis, the virtual calibration module selects a line generally along the y-axis known to be a straight line during machine setup. The toolhead is then instructed to move along the selected straight line and the actual movement of the toolhead is detected. The virtual calibration module selects multiple points along the axis of travel, such as the two absolute points and/or any number of points therebetween, and computes the angular displacement of that line and compares the distance of those points, as many as selected, from the true axis. The distance from the true axis to the selected point is the offset amount, and be measured, for example, in mm. In certain aspects, this straight line can also be compared to the x-axis when virtually squaring the machine, or compared relative thereto when making other measurements relational to the y-axis. For example, an offset amount of +2 mm at a selected point may be compensated for by modifying the g-code −2 mm at that same point, with the same compensation methodology being applied to the slope of a line through the selected multiple points.

In the case of the x-axis, virtual squaring can be achieved for the x-axis by squaring relative to the virtual alignment y-axis line. For example, the toolhead 41 of the machine tool 40 can be instructed by the numeric controller 30 in the CNC machine to move to an extreme range along the x-axis to determine the degree of deviation from square, or at one or more points therebetween. The deviation of the virtual x-axis is loaded into the module to calculate virtual square. In certain aspects, deviation is detected and the amount of deviation (or offset) is determined. In certain aspects, the g-code instructions are then modified based to correct this offset prior to passing the g-codes to the CNC controller and prior to machining the object.

In the case of the z-axis, virtual leveling is achieved by determining the offset of multiple axes computed by taking the average of a number of points along the axes and creating a grid to determine the slope. Points can include, for example, 3, 4, 5, 6, 7, 8, 9, or 10 spaced points, for example, to determine the slope of the line. Complex versions of virtual z-axis leveling can include measuring a greater number of points, for example 50 to 2000 points per inch, 100 to 1500 points per inch, 150 to 1250 points per inch, 200 to 1000 points per inch, 500 to 800 points per inch, 600 to 700 points per inch, to map the surface to determine if the surface is warped or distorted. From the mapping, deviation calculations can be made by the virtual calibration module along any point to provide a simulated flat surface for machining. In certain aspects, deviation is detected and the amount of deviation (or offset) is determined. In certain aspects, the g-code instructions are then modified based to correct this offset by virtual squaring and/or virtual leveling prior to passing the g-codes to the CNC controller and prior to machining the object.

When setting up the CNC machine, each of the points discussed above are monitored by the virtual calibration module to determine offsets. The amount of offsets of the axes can be obtained by picking two or more points along the traversing paths of the axes. Based on the offsets of points from the axes, the g-code instructions are modified to include the offsets accordingly and passed to the CNC controller to be executed. In certain aspects, the offsets can be corrected by modifying the g-code sequentially. For example, the g-code for one axis may be modified before modifying g-code for another axis when using the virtual calibration method of the present invention. In certain aspects, all offsets can be corrected for by modifying all g-code simultaneously.

In certain aspects, the g-codes that can be modified to virtually calibrate a machine using the method of the present invention include, but are not limited to, G00 for positioning, G01 for linear interpolation, G17 XY axis selection, G18 ZX axis selection, G19 YZ axis selection, G20 programming in inches, G21 programming in millimeters, or any combination thereof. In certain aspects, at least one, two, three, four, five, or six of these g-codes may be modified to correct for any deviation detected in the machine.

Figure 2:
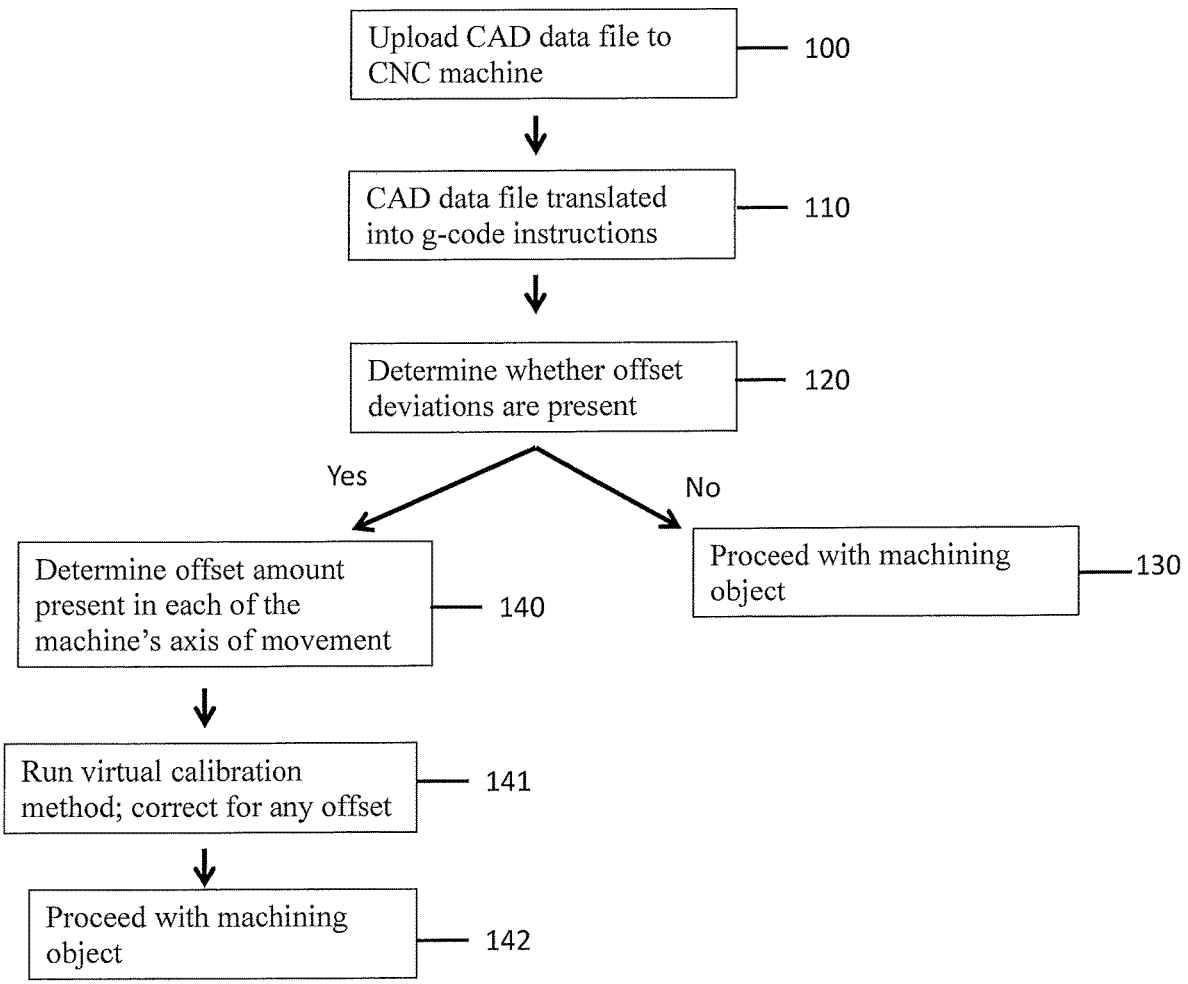
FIG. 2 is a flow diagram illustrating the virtual calibration method according to an embodiment of the invention.

FIG. 2 is a block diagram associated with the virtual calibration method of the present invention. As shown in FIG. 2, a CAD data file may be uploaded to a CNC machine 100. The CAD data file may be subsequently translated into g-code instructions 110 by, for example, a translation module. Before running the g-code instructions and shaping an object into a desired shape, it is preferable to determine whether any offset deviations 120 are present in any of the machine's movement axes. If "No" deviations exist, the machine is calibrated and one may proceed 130 with machining an object into a desired shape. However, if it is determined that "Yes" deviations exist, the offset amount present in each of the machines axes of movement is determined 140. After determining of offset present 140, the virtual calibration method may be run 141, and during 141, g-codes are modified to correct for any deviations that exist in order to "virtually" calibrate the machine. After correcting for the offset determined in 140, one may proceed 142 with machining an object to obtain a desired shape substantially free of any errors that are associated with an uncalibrated machine.

In certain aspects, the above described machines, for example CNC machines, are computers designed and programmed to implement the above described virtual calibration modules. In certain aspects, these CNC machines include a processor, memory, an input interface for inputting, for example, CAD data files and/or modifying g-code, and an output interface. In certain aspects, the virtual calibration modules are computer readable configured to instruct a computer to implement this virtual calibration method.

In certain aspects, the virtual calibration method advantageously reduces machining time by avoiding mechanical calibration of, for example, a CNC machine. In certain aspects, this virtual calibration method further advantageously increases production of a particular object by avoiding this arduous and time-consuming mechanical calibration.

The foregoing description provides embodiments of the invention by way of example only. It is envisioned that other embodiments may perform similar functions and/or achieve similar results. Any and all such equivalent embodiments and examples are within the spirit and scope of the present invention

What is claimed is:

1. A method for virtually calibrating a computer numeric controlled (CNC) machine to compensate for surface distortions on an object to be machined, said method comprising:

providing g-code instructions for machining a surface of a distortion-free object;

selecting a true axis of movement of a toolhead of the CNC machine prior to machining the object to be machined using the g-code instructions, where the true axis is a straight line;

instructing the toolhead to travel on the object to be machined along the true axis, but where the toolhead actually travels along an actual axis that is deviated from the true axis as a result of the surface distortions on the object to be machined;

selecting multiple points along the actual axis;

measuring the surface distortions particular to the object to be machined by comparing a distance between each of the multiple points along the actual axis and the true axis to determine an offset amount of each of the multiple points to determine a lack of straightness of the object to be machined; and modifying the g-code instructions for machining the object to be machined based on the determined offset amounts to correct for the measured surface distortions particular to the object to be machined before uploading the g-codes to a CNC controller.

2. The method of claim 1 further comprising computing a slope of a line through the selected multiple points and comparing the slope of the line to the true axis of movement to determine an angular displacement of the line and offset amounts.

3. The method of claim 1 wherein the true axis is a straight line along one of an x, y and z linear axis of movement of the toolhead, the x and y axes being arranged perpendicular to one another and arranged in a horizontal plane parallel with a table of the CNC machine, and the z axis is arranged perpendicular relative to an x-y horizontal plane defined by the x and y axes.

4. The method of claim 3 further comprising determining offset amounts between the true axis and actual axis along two of the x, y and z axes and comparing the offset amounts to virtually square the axes.

5. The method of claim 1 further comprising loading the offset amounts of the selected points into a matrix containing offset coordinates to create a 3D model of a work area.

6. The method of claim 1 further comprising virtually leveling a z-axis of the CNC machine by determining offset amounts of multiple axes computed by taking an average of a number of points along the multiple axes and creating a grid to determine a slope of a line through the selected multiple points.

7. The method of claim 6 wherein the number of selected points includes from 50 to 2000 points per inch.

8. The method of claim 1 wherein the g-code modified represents one or more of linear, circular and arcuate movement.

9. The method of claim 1 further comprising uploading a CAD file to the CNC machine and translating the CAD file into the g-code instructions.

10. A method for virtually calibrating a CNC machine to compensate for surface distortions on an object to be machined, said method comprising:
providing g-code instructions representing movement of a toolhead of the CNC machine for machining an object free of surface distortions;
selecting a linear axis of movement of the toolhead from one of x, y and z
linear axes of movement prior to machining the object to be machined;
instructing the toolhead to travel on the object to be machined along the selected linear axis of movement, but where the toolhead actually travels along an actual axis that is deviated from the linear axis as a result of the surface distortions on the object to be machined;
selecting multiple points along the actual axis;
measuring the surface distortions particular to the object to be machined by comparing a distance between each of the multiple points along the actual axis and the selected linear axis to determine an offset amount of each of the multiple points; and
modifying the g-code instructions for machining the object to be machined based on the determined offset amounts to compensate for surface distortions particular to the object to be machined before uploading the g-codes to a CNC controller.

11. The method of claim 10 further comprising computing a slope of a line through the selected multiple points and comparing the slope of the line to the selected linear axis of movement to determine an angular displacement of the line and offset amounts.

12. The method of claim 10 wherein the linear axis is a straight line along one of an x, y and z linear axis of movement of the toolhead, the x and y axes being arranged perpendicular to one another and arranged in a horizontal plane parallel with a table of the CNC machine, and the z axis arranged perpendicular relative to the x-y horizontal plane.

13. The method of claim 12 further comprising determining offset amounts along two of the x, y and z axes and comparing the offset amounts to virtually square the axes.

14. The method of claim 10 further comprising loading the offset amounts of the selected points into a matrix containing offset coordinates to create a 3D model of a work area.

15. The method of claim 10 further comprising virtually leveling a z-axis of the CNC machine by determining offset amounts of multiple axes computed by taking an average of a number of points along the multiple axes and creating a grid to determine the slope.

16. The method of claim 15, wherein the number of points includes from 50 to 2000 points per inch.

17. The method of claim 10, wherein the g-code modified represents one or more of linear, circular and arcuate movement.

18. A system for virtually calibrating a computer numeric controlled (CNC) machine to compensate for surface distortions on an object to be machined, said system comprising:
means for providing g-code instructions for machining a surface of a distortion-free object;
means for selecting a true axis of movement of a toolhead of the CNC machine prior to machining the object to be machined using the g-code instructions, where the true axis is a straight line;
means for instructing the toolhead to travel on the object to be machined along the true axis, but where the toolhead actually travels along an actual axis that is deviated from the true axis as a result of the surface distortions on the object to be machined;
means for selecting multiple points along the actual axis;
means for measuring the surface distortions particular to the object to be machined by comparing a distance between each of the multiple points along the actual axis and the true axis to determine an offset amount of each of the multiple points to determine a lack of straightness of the object to be machined; and
means for modifying the g-code instructions for machining the object to be machined based on the determined offset amounts to correct for the measured surface distortions particular to the object to be machined before uploading the g-codes to a CNC controller.

19. The system of claim 18 further comprising means for computing a slope of a line through the selected multiple points and comparing the slope of the line to the true axis of movement to determine an angular displacement of the line and offset amounts.

20. The system of claim 18 wherein the true axis is a straight line along one of an x, y and z linear axis of movement of the toolhead, the x and y axes being arranged perpendicular to one another and arranged in a horizontal plane parallel with a table of the CNC machine, and the z axis is arranged perpendicular relative to an x-y horizontal plane defined by the x and y axes.

* * * * *